US011967764B1

(12) United States Patent
Lim et al.

(10) Patent No.: US 11,967,764 B1
(45) Date of Patent: Apr. 23, 2024

(54) SINGLE ANTENNA WITH DUAL CIRCULAR POLARIZATIONS AND QUAD FEEDS FOR MILLIMETER WAVE APPLICATIONS

(71) Applicant: Waymo LLC, Mountain View, CA (US)

(72) Inventors: Edwin Lim, Cupertino, CA (US); Marvin Weinstein, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 258 days.

(21) Appl. No.: 17/508,757

(22) Filed: Oct. 22, 2021

(51) Int. Cl.

| | |
|---|---|
| ***H01Q 1/50*** | (2006.01) |
| ***H01P 3/12*** | (2006.01) |
| ***H01P 3/16*** | (2006.01) |
| ***H01Q 21/00*** | (2006.01) |
| ***H01Q 21/24*** | (2006.01) |

(52) U.S. Cl.
CPC ......... *H01Q 21/0006* (2013.01); *H01P 3/121* (2013.01); *H01P 3/16* (2013.01); *H01Q 1/50* (2013.01); *H01Q 21/24* (2013.01)

(58) Field of Classification Search
CPC ...... H01Q 21/24; H01Q 1/50; H01Q 21/0006; H01P 3/16; H01P 3/121
USPC ........................................................ 174/68.1
See application file for complete search history.

(56) References Cited

U.S. PATENT DOCUMENTS

| | | | |
|---|---|---|---|
| 7,619,568 | B2 | 11/2009 | Gillette |
| 11,088,452 | B2 | 8/2021 | Avser et al. |
| 2020/0006862 | A1 | 1/2020 | Thompson, Jr. et al. |

OTHER PUBLICATIONS

Yiping Xia, et al., "Quadruple Feed MIMO Antennas with One Shared Radiator for 5G Mobile Terminals," IEEE Conference Publication, IEEE Explore, Jul. 2018.

Hao-Tian Zhu, et al., "Low-Cost Narrowed Dielectric Microstrip Line—A Three-Layer Dielectric Waveguide Using PCB Technology for Millimeter-Wave Applications," IEEE Transactions on Microwave Theory and Techniques, IEEE Explore, Jan. 2017.

*Primary Examiner* — Tremesha S Willis
(74) *Attorney, Agent, or Firm* — McDonnell Boehnen Hulbert & Berghoff LLP

(57) ABSTRACT

Example embodiments relate to a substrate integrated waveguide (SIW) with dual circular polarizations. An example SIW may include a dielectric substrate and a first metallic layer coupled to a top surface of the dielectric substrate with a through-hole extending through the dielectric substrate and the first metallic layer. The SIW also includes a dielectric layer coupled to a top surface of the first metallic layer. A second metallic layer is coupled to a top surface of the dielectric layer. The second metallic layer includes a non-conductive opening, a plurality of feeds with a first end in the non-conductive opening and a second end including a single-ended termination, and an impedance transformer. The SIW also includes a third metallic layer coupled to a bottom of the dielectric substrate, and a set of metallic via-holes proximate the non-conductive opening and coupling the second metallic layer to the third metallic layer.

20 Claims, 6 Drawing Sheets

SINGLE ANTENNA WITH DUAL CIRCULAR POLARIZATIONS AND QUAD FEEDS FOR MILLIMETER WAVE APPLICATIONS

BACKGROUND

A transmission line represents a structure designed to transfer microwave or millimeter power and can be used in various applications. For instance, transmission lines (feed lines) can couple together radio transmitters and receivers with antennas, or establish computing device network connections and high speed data buses. Transmission lines can also be used to couple together printed circuit boards (PCB) with waveguides.

Microstrip circuits and waveguides are two types of transmission lines that are often used for applications involving high frequency electromagnetic energy. A microstrip circuit may include a signal carrying microstrip that is separated from a ground plane via a dielectric material. Waveguides are typically hollow conductive conduits with a circular or rectangular cross section that can enable electromagnetic energy to propagate internally between two points with minimal loss. Some systems involve a combination of waveguides and microstrips in different portions of the system. For example, radar systems may operate using signals that propagate between microstrips or similar transmission lines on a PCB and waveguides that connect to radiating elements. Similarly, lidar systems may operate using signals that propagate between microstrips or other similar transmission lines on a PCB and waveguides that connect to beam steering elements. In such applications, it is often desirable for the transition elements to efficiently couple energy that propagates between different mediums, such as microstrips and waveguides. One technique used to efficiently couple energy that propagates between different mediums, such as microstrips and waveguides is to utilize a rectangular waveguide coupled to a PCB antenna.

SUMMARY

Example embodiments describe an antenna system with a circular waveguide on a PCB, which may be used within rotary joint applications for bi-directional communication. The PCB may include substrate integrated waveguide (SIW) transitions that can be used to electrically couple the waveguide to another component, such as a microstrip or another type of transmission line. Such SIW transitions can include four feeds with dual polarizations configured to concurrently provide the signals for transmission by the antenna structure and receive signals from the antenna structure for subsequent processing.

In one aspect, an apparatus is provided. The apparatus includes a dielectric substrate and a first metallic layer. A bottom surface of the first metallic layer is coupled to the top surface of the dielectric substrate. The apparatus further includes a through-hole extending through the dielectric substrate and the first metallic layer. The apparatus also includes a dielectric layer with a bottom surface coupled to a top surface of the first metallic layer. A second metallic layer is coupled to the top surface of the dielectric layer. The second metallic layer includes a non-conductive opening, a plurality of feeds each with a first end located in the non-conductive opening and a second end of each feed including a single-ended termination, and an impedance transformer. The apparatus also includes a third metallic layer coupled to a bottom surface of the dielectric substrate, and a set of metallic via-holes positioned proximate the non-conductive opening in the second metallic layer. The set of metallic via-holes electrically couple the second metallic layer to the third metallic layer.

In another aspect, a system is provided. The system includes a waveguide and a substrate integrated waveguide (SIW) transition coupled to the waveguide. The SIW transition includes a dielectric substrate and a first metallic layer. A bottom surface of the first metallic layer is coupled to the top surface of the dielectric substrate. The SIW further includes a through-hole extending through the dielectric substrate and the first metallic layer. The SIW also includes a dielectric layer with a bottom surface coupled to a top surface of the first metallic layer. A second metallic layer is coupled to the top surface of the dielectric layer. The second metallic layer includes a non-conductive opening, a plurality of feeds each with a first end located in the non-conductive opening and a second end of each feed including a single-ended termination, and an impedance transformer. The SIW also includes a third metallic layer coupled to a bottom surface of the dielectric substrate, and a set of metallic via-holes positioned proximate the non-conductive opening in the second metallic layer. The set of metallic via-holes electrically couple the second metallic layer to the third metallic layer In yet another aspect, a method is provided. The method involves conducting electromagnetic energy via a transmission line on a PCB and coupling the electromagnetic energy into a waveguide via an SIW transition. The SIW transition includes a dielectric substrate and a first metallic layer. A bottom surface of the first metallic layer is coupled to the top surface of the dielectric substrate. The SIW further includes a through-hole extending through the dielectric substrate and the first metallic layer. The SIW also includes a dielectric layer with a bottom surface coupled to a top surface of the first metallic layer. A second metallic layer is coupled to the top surface of the dielectric layer. The second metallic layer includes a non-conductive opening, a plurality of feeds each with a first end located in the non-conductive opening and a second end of each feed including a single-ended termination, and an impedance transformer. The SIW also includes a third metallic layer coupled to a bottom surface of the dielectric substrate, and a set of metallic via-holes positioned proximate the non-conductive opening in the second metallic layer. The set of metallic via-holes electrically couple the second metallic layer to the third metallic layer. The method further involves transmitting the electromagnetic energy as a first signal via one or more antennas coupled to the waveguide.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
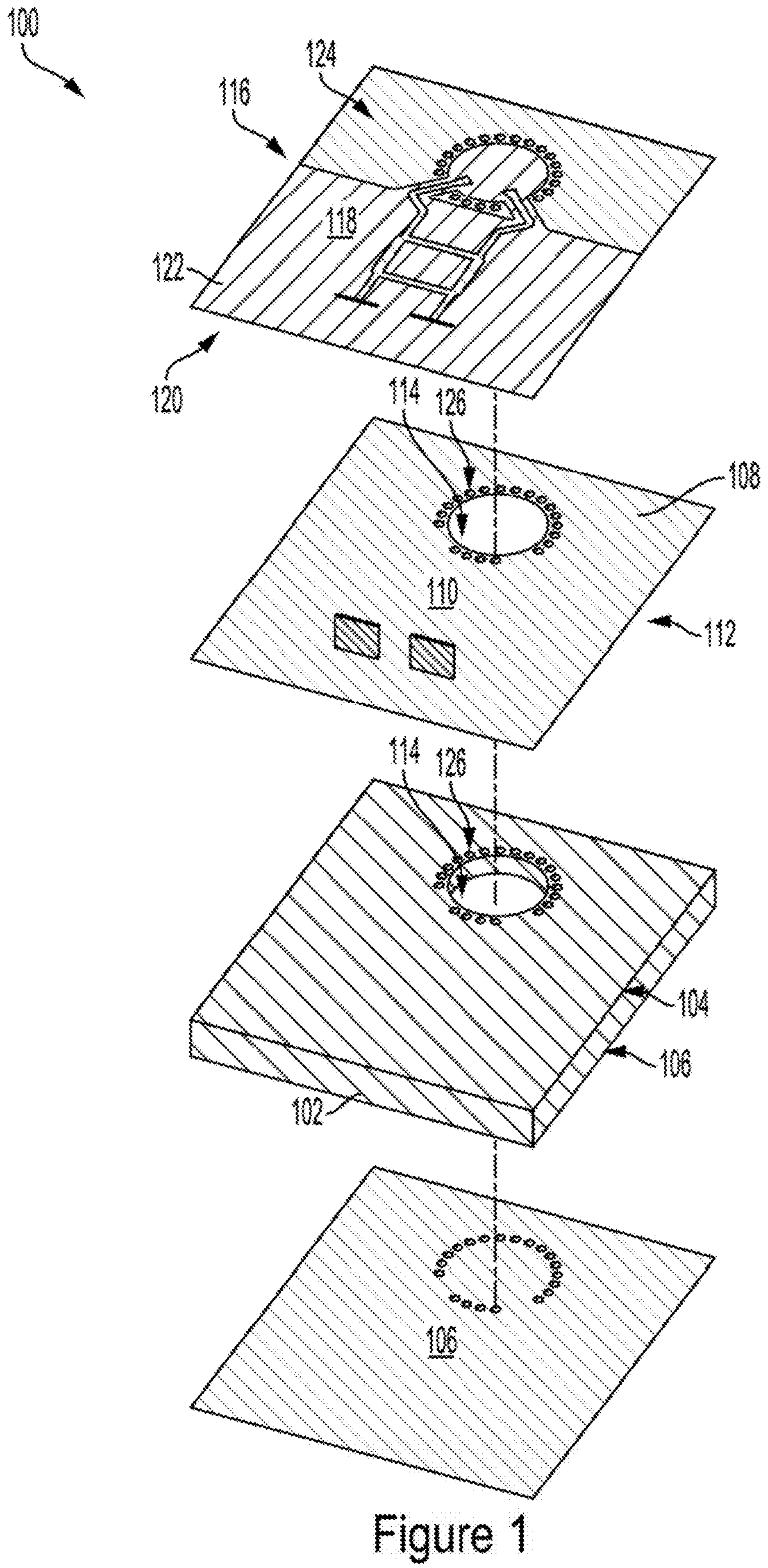
FIG. 1 illustrates a single antenna with dual feeds, and multiple layers, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As technology advances, the need for millimeter systems increases in different types of applications. For example, high-performance millimeter systems may be desirable in rotary joint operations. Currently, for high frequency applications (e.g., above 10 GHz), waveguides are often used to avoid the high insertion and radiation losses that can impact other types of transmission medium (e.g., microstrips, coplanar lines) at these frequencies. Waveguides are typically used to minimize radiation losses and enable low insertion losses when used to propagate electromagnetic energy. However, in transmission mediums when waveguides are not suitable, a SIW may be used.

A SIW is a structure with low-loss interconnect architecture and can be used at millimeter wave frequencies. Unlike other types of transmission medium (e.g., microstrips) that may suffer from transmission drops at higher frequencies, grounded coplanar waveguides can provide low insertion loss at frequencies that exceed 40 Gigahertz (GHz). As such, SIWs can be configured to operate with low insertion loss within applications at higher frequencies, such as 5G, radar (including vehicle radar systems and lidar systems), and other systems that utilize the millimeter wave band.

In general, a SIW is a type of synthetic electromagnetic waveguide formed in a dielectric substrate by a set of densely arrayed metallized posts, also referred to herein as metallic via-holes or plated through-holes that each serve as connections between the upper and lower metal plates of the substrate. Rows of these metallic via-holes can be arranged to form via fences that delimit the wave propagation area of the SIW. SIWs can be fabricated via low-cost mass-production processes that use through-hole techniques that enable a SIW to operate with similar guided wave and mode characteristics relative to conventional rectangular waveguides with equivalent guide wavelength.

SIW transition configurations can be used to provide a single-ended PCB-to waveguide transition enabling energy to couple between one or more transmission lines on a PCB and a rectangular waveguide. However, rectangular waveguides may not be compatible with every application. For example, the electric field in a rectangular waveguide is not compatible in rotary joint applications because rotating a rectangular waveguide can result in electric field discontinuations. Further, single-ended PCBs are frequently implemented with the rectangular waveguides. These single-ended PCBs are not typically capable of simultaneous bi-directional communication. Thus, there is a desire for SIWs to be designed in a way that provides an efficient transition between transmission lines and circular waveguides and allows for simultaneous bi-directional communication. In addition, some of these applications may require for a SIW to have dual circular polarizations and a plurality of feeds between PCB transmission lines and a waveguide.

Example embodiments presented herein relate to SIW transition configurations that can provide a PCB to circular waveguide transition enabling energy to couple between one or more transmission lines on the PCB and a waveguide in bi-directional communication. Some examples may relate to an antenna with a circular waveguide on a PCB, which may be used within rotary joint applications. The PCB may include a plurality of feeds with left-hand and right-hand polarizations, such that the electric fields of the feeds are decoupled and may simultaneously transmit and receive signals. These SIW transition configurations may be produced using simplified PCB etching techniques and implemented within systems to enable efficient propagation of electromagnetic energy between different transmission mediums. For example, communication systems, antennas, radar systems (e.g. vehicle radar systems), lidar systems (e.g. vehicle lidar systems) and other types of computing devices may be implemented using one or more example SIW transitions. Additional example embodiments are also presented that describe methods for using one or more example SIW transitions to facilitate electromagnetic energy propagation within an antenna structure and other types of system (e.g., vehicle radar systems, or vehicle lidar systems) that include one or more transitions between a waveguide and another type of transmission medium.

By way of an example, a SIW transition can be generated using a PCB with copper layers and PCB laminate layers. For instance, the SIW transition may include a middle layer, a top layer coupled to the middle layer, and a bottom layer coupled to the middle layer. Each of the layers may include multiple components. In an example embodiment, the middle layer includes a dielectric substrate (e.g., a low cost PCB laminate) having a top surface and a bottom surface with a first metallic layer (e.g., copper) coupled to the top surface. A through-hole may extend through the dielectric substrate and the first metallic layer. For instance, a milling technique can remove portions of the dielectric substrate and the first metallic layer to create a through-hole that fully extends through the middle layer. The through-hole may assist in generating a more efficient waveguide by removing less efficient material. The top layer may not include a through-hole, but may cover the through-hole that extends through the middle layer. The top layer can include a dielectric layer having a top surface and a bottom surface. The bottom surface is coupled to the first metallic layer. The top surface of the dielectric layer can have a second metallic layer (e.g., copper) exposed and PCB laminate on the other remaining portion. In an example embodiment, the first metallic layer and the second metallic layer can be different layers. In another embodiment, the first metallic layer and the second metallic layer can be the same metallic layer. For instance, an etching technique can remove portions of the PCB laminate to expose portions of a copper layer, such as first metallic layer, as desired for the configuration of the SIW transition. The second metallic layer on the top surface can include a nonconductive opening, a plurality of feeds with a first end of each feed located in the non-conductive opening and a second end of each feed including a single-ended termination, and an impedance transformer between the plurality of feeds. The bottom layer includes a third metallic layer (e.g., a copper layer) coupled to a bottom surface of the dielectric substrate and may cover the through-hole that extends through the middle layer. The third metallic layer is electrically coupled to the second metallic layer in the top layer via a set of metallic via-holes. The metallic via-holes can be positioned proximate the non-conductive opening in the second metallic layer.

As indicated above, the SIW includes a circular through-hole that extends through the dielectric substrate and first metallic layer to generate an efficient waveguide. The third metallic layer of the bottom layer may cover the circular through-hole in the dielectric substrate and the first metallic layer. While the dielectric layer of the top layer may cover the circular through-hole, the dielectric layer also includes a second metallic layer on top of the dielectric layer with a non-conductive opening. The non-conductive opening may be a circular non-conductive portion in the second metallic layer and may be in the same position as the through-hole. A circular waveguide can couple to the SIW transition at the circular non-conductive portion.

The metallic via-holes can form the boundaries of the waveguide around the circular non-conductive portion by forming walls within the dielectric substrate and can couple together the upper and lower metallic layers. As such, the arrangement (e.g., spacing, position, quantity) of metallic via-holes can influence transition properties (e.g., cutoff frequencies, insertion losses) of the SIW transition and can vary within example embodiments. In some embodiments, the SIW transition includes a set of metallic via-holes that encircle the circular non-conductive portion and the through-hole below the circular non-conductive portion. As such, the arrangement and position of the metallic via-through-holes can impact the cutoff frequencies of the SIW. In addition, the spacing of the metallic via-holes can influence the insertion losses of the transitions.

As indicated above, the SIW transition includes a plurality of feeds. In some embodiments, the SIW may include two feeds and two single-ended terminations. The feeds may each include a first end and a second end. The first ends can extend into the non-conductive circular opening of the second metallic layer. The second end of each feed can be a single-ended termination configured to connect to a transmission line.

Some example SIW transitions include an impedance transformer. The impedance transformer can be a rectangular connection connecting two of the feeds in the plurality of feeds. The impedance transformer is positioned between the single-ended terminations and the non-conductive circular opening. The configuration of the impedance transformer can taper the impedance of the SIW transition down or up to any desired single-ended impedance. Further, the impedance transformer can quadrate the phase between the two feeds and transform impedance by a quarter wavelength.

In an embodiment with two feeds, each with respective single-ended terminations, an antenna may be able to generate an electromagnetic field with left-hand circular polarization from one of the feeds and an electromagnetic field with right-hand circular polarization from the other feed. By having one field with left-hand circular polarization and another field with right-hand circular polarization, the fields are decoupled and the feeds can be used for bi-directional communications by one PCB. For example, the feed with left-hand circular polarization could be used to transmit while the feed with the right-hand circular polarization is used to receive. When transmitting, two PCBs with the described SIW transition may be positioned opposite each other in communication and, in some examples, there may be an air-gap between the waveguides. Alternatively, the two waveguides may be mechanically coupled together in other examples.

In an example embodiment, as previously mentioned, two identical PCBs may be in communication with each other. For example PCB A and PCB B. PCB A may have feed one and feed two. Feed one may have a left-hand circular polarization and may be connected to a receiver. Feed two may have a right-hand circular polarization and may be connected to a transmitter. PCB B may have feeds three and four. Feed three may have a left-hand circular polarization and may be connected to a transmitter. Feed one and feed three may be in communication. Feed four may have a right-hand circular polarization and may be connected to a receiver. Feed two and feed four may be in communication. In this configuration, feed four and feed three may be crossed in order to connect to the appropriate ports of a transceiver.

In some example embodiments, the SIW can include four feeds. The feeds may extend from two opposite ends of the circular non-conductive opening. In other words, two feeds extend from one side of the non-conductive opening and two feeds from the other. The non-conductive opening, and the through-hole below it, may be positioned in the center of the PCB in this embodiment. As with the dual feeds, each of the four feeds may include a first end and a second end. The first end of each feed can extend into the non-conductive opening of the second metallic layer. The second end of each feed can be a single-ended termination configured to connect to a transmission line.

As previously discussed for the dual feeds, the quad feeds may also include impedance transformers. Specifically, the two feeds for the single-ended terminations on the same side of the non-conductive opening may have an impedance transformer in the form of a metallic rectangle connecting the two feeds, the same can be true for the two feeds on the opposite side of the non-conductive opening, totaling in two impedance transformers. The impedance transformers are positioned between the single-ended terminations for the respective feeds and the non-conductive opening. The configuration of the impedance transformers can taper the impedance of the SIW transition down or up to any desired single-ended impedance. Further, the impedance transformers can quadrate the phase between the two respective feeds and transform impedance by a quarter wavelength.

An example embodiment may include four feeds on a PCB; two feeds that have right-hand circular polarization and two feeds that have left-hand circular polarization. The quad feed configuration may provide a more symmetric way of connecting the antenna to the transceiver without having to cross feeds. For example, if feeds one and two are on one side of the non-conductive opening, and feeds three and four are on the other side, feed two may be connected to a receiver, feed three may be connected to a transmitter, and feeds one and four may be terminated with an impedance matched resistor. Unlike the dual feeds, the quad feeds may be used for bi-directional communication without the need to cross any feeds.

Various systems, including different types of antennas, can be implemented using one or more SIW transitions. Some examples include radar systems, LiDAR systems, communication systems, and other sensors that may require high-speed links between PCBs using waveguides.

The following detailed description may be used with an apparatus (e.g., radar unit) having one or multiple antenna arrays. The one or multiple antenna arrays may take the form of a MIMO radar antenna architecture. One or more antenna arrays can include uniform linear array (ULA) arrangements and/or staggered arrangements. In a staggered arrangement, one or more radiating elements (antennas) can be offset relative to the alignment of other radiating elements in the array. In some embodiments, example radar unit architecture may include a plurality of circular waveguide antennas. The term "circular waveguide" antennas may refer to a conductive cylinder, through which electromagnetic waves are transferred, radiating within it. In some instances, multiple "circular waveguide" antennas may be arranged into one or more antenna arrays.

Some example radar systems may be configured to operate at an electromagnetic wave frequency in the W-Band (e.g., 77 Gigahertz (GHz)). The W-Band may correspond to electromagnetic waves on the order of millimeters (e.g., 1 mm, 4 mm). A radar system may use one or more antennas that can focus radiated energy into tight beams to measure an environment with high accuracy. Such antennas may be compact, efficient (i.e., with little of the 77 GHz energy lost to heat in the antenna or reflected back into the transmitter electronics), low cost and easy to manufacture (i.e., radar systems with these antennas can be made in high volume).

Some example radar architecture may include multiple metal layers (e.g., aluminum plates) machined with computer numerical control (CNC), aligned and joined together. For example, a metal layer may include a first half of an input waveguide channel, where the first half of the first waveguide channel includes an input port that may be configured to receive electromagnetic waves (e.g., W-band waves) into the first waveguide channel. The metal layer may also include a first half of a plurality of wave-dividing channels. The plurality of wave-dividing channels may comprise a network of channels that branch out from the input waveguide channel and that may be configured to receive electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels. The waveguide antenna elements and/or the waveguide output ports may be circular in shape, in some embodiments. In alternative embodiments, the waveguide antenna elements and/or the waveguide output ports may be rectangular in shape. Other shapes are also possible.

Based on the shape and the materials of the waveguides, the distribution of propagating energy can vary at different locations within a radar unit, for example. The shape and the materials of the waveguides can define the boundary conditions for the electromagnetic energy. Boundary conditions are known conditions for the electromagnetic energy at the edges of the waveguides. For example, in a metallic waveguide, assuming the waveguide walls are nearly perfectly conducting (i.e., the waveguide walls can be approximated as perfect electric conductors—PECs), the boundary conditions specify that there is no tangentially (i.e., in the plane of the waveguide wall) directed electric field at any of the wall sides. Once the boundary conditions are known, Maxwell's Equations can be used to determine how electromagnetic energy propagates through the waveguides.

Maxwell's Equations may define several modes of operation for any given polarization-modification channel or waveguide. Each mode has one specific way in which electromagnetic energy can propagate through the waveguide. In addition, each mode has an associated cutoff frequency. A mode is not supported in a waveguide if the electromagnetic energy has a frequency that is below the cutoff frequency. By properly selecting both (i) dimensions and (ii) frequency of operation, electromagnetic energy may propagate through the polarization-modification channels and waveguides in specific modes. The waveguides can be designed so only one propagation mode is supported at the design frequency.

There are four main types of waveguide propagation modes: Transverse Electric (TE) modes, Transverse Magnetic (TM) modes, Transverse Electromagnetic (TEM) modes, and Hybrid modes. In TE modes, the electromagnetic energy has no electric field in the direction of the electromagnetic energy propagation. In TM modes, the electromagnetic energy has no magnetic field in the direction of the electromagnetic energy propagation. In TEM modes, the electromagnetic energy has no electric or magnetic field in the direction of the electromagnetic energy propagation. In Hybrid modes, the electromagnetic energy has some of both electric field and magnetic field the direction of the electromagnetic energy propagation.

TE, TM, and TEM modes can be further specified using two suffix numbers that correspond to two directions orthogonal to the direction of propagation, such as a width direction and a height direction. A non-zero suffix number indicates the respective number of half-wavelengths of the electromagnetic energy equal to the width and height of the respective polarization-modification channel or waveguide (e.g., assuming a rectangular waveguide). However, a suffix number of zero indicates that there is no variation of the field with respect to that direction. For example, a TE10 mode indicates the polarization-modification channel or waveguide is half-wavelength in width and there is no field variation in the height direction. Typically, when the suffix number is equal to zero, the dimension of the waveguide in the respective direction is less than one-half of a wavelength. In another example, a TE21 mode indicates the waveguide is one wavelength in width (i.e., two half wavelengths) and one half wavelength in height.

When operating a waveguide in a TE mode, the suffix numbers also indicate the number of field-maximums along the respective direction of the waveguide. For example, a TE10 mode indicates that the waveguide has one electric field maximum in the width direction and zero maxima in the height direction. In another example, a TE21 mode indicates that the waveguide has two electric field maxima in the width direction and one maximum in the height direction.

Referring now to the figures, FIG. 1 illustrates a single antenna 100 with dual circular polarizations and dual feeds, according to one or more example embodiments. The antenna 100 is shown as a PCB structure with a SIW. As shown, the PCB is layered to help generate the SIW waveguide. The walls of SIW are formed by via-holes 126 (plated through-holes) that are drilled through parallel layers.

In an example embodiment, as shown in FIG. 1, the PCB structure includes a dielectric substrate 102. The dielectric substrate 102 can be made of a PCB laminate. For example, the PCB laminate may be a composite material composed of woven fiberglass cloth with an epoxy resin binder, such as FR-4. FR-4 may be considered as a standard PCB laminate with standard loss. For example, at 7 GHz, the FR-4 can have a loss of 6.5 dB per inch. However, FR-4 may have a low cost of manufacturing and purchasing.

Dielectric substrate 102 may further include a top surface 104 and a bottom surface 106. A third metallic layer can be coupled to the bottom surface 106 of the dielectric substrate. A first metallic layer 108 may be coupled to the top surface 104 of the dielectric substrate 102. The first metallic layer 108 may include a top surface 110 and a bottom surface 112. The bottom surface 112 of the first metallic layer 108 may be coupled to the top surface 104 of the dielectric substrate 102. The first metallic layer 108 and third metallic layer may be copper. In additional embodiments, the first metallic layer 108 and third metallic layer could also be another highly conductive metal or a combination of metals, such as gold, silver, aluminum, and/or brass.

In an example embodiment, the PCB structure of the antenna 100 includes a through-hole 114 extending through the dielectric substrate 102 and the first metallic layer 108. The through-hole 114 may be milled using conventional milling techniques. The through-hole 114 can be a hollow through the dielectric substrate 102 that is made from a low cost, but Radio Frequency (RF) lossy material. In an example embodiment, the through-hole 114 through the dielectric substrate 102 can contribute to attempting to form an efficient waveguide.

A dielectric layer 116 can be coupled to the top surface 110 of the first metallic layer 108 and can extend across the through-hole 114 extending through the dielectric substrate 102 and the metallic layer 108. The dielectric layer 116 can include a top surface 118 and a bottom surface 120. The bottom surface 120 of the dielectric layer 116 may be coupled to the top surface 110 of the first metallic layer 108. At least a portion of the top surface 118 of the dielectric layer 116 can also be a PCB laminate 122 material, but the PCB laminate 122 material for the dielectric layer 116 can be less lossy than the material used for the dielectric substrate 102. For example, the PCB laminate material for the dielectric layer 116 can be a low RF lossy material such as Rogers RO3003.

Further, the dielectric layer 116 may be a continuous layer and, as previously mentioned, may cover the through-hole 114 extending through the dielectric substrate 102 and the first metallic layer 108. The motivation of the through-hole 114 can be to have a more efficient waveguide by milling out the lossy PCB laminate used for dielectric substrate 102. However, since the PCB laminate 122 for the dielectric layer 116 is less lossy and more RF friendly, the dielectric layer 116 may cover the through-hole 114.

In an example embodiment, a second metallic layer 124 can be coupled to the top surface 118 of the dielectric layer 116. Specifically, the second metallic layer 124 can be etched onto a portion of the PCB laminate 122 material of the dielectric layer 116. For instance, an etching technique can remove portions of the PCB laminate 122 to expose portions of a copper layer as desired for the configuration of the PCB structure. In an example embodiment, first metallic layer 108 and second metallic layer 124 can be the same metallic layer, so that the etching process exposes portions of first metallic layer which make up second metallic layer. In another embodiment, the first metallic layer and the second metallic layer can be different layers so that the etching only exposes second metallic layer.

The antenna 100 can be manufactured using PCB etching and drilling processes. In some implementations, a set of metallic via-holes 126 are back drilled to remove any remaining stubs from the substrate. The via-holes 126 provide confinement of electromagnetic waves that propagate in the SIW. The level of confinement may depend on via diameter (d) and via spacing (s) (i.e., space extending between the centers of consecutive via-holes) as shown in FIG. 1. In general, the via walls formed by via-holes can act like a typical via-fence in an radio frequency (RF) PCB layout that confines electromagnetic radiation within the arrangement of via-holes.

All these applications may rely on constructive interference involving one or more electromagnetic waves in a well-defined structure. As such, a substrate integrated waveguide design and other structures are extremely useful in the V band/M band and higher, where active RF components are still lacking in terms of performance. An advantage for use in millimeter wave circuits is the reduced losses in the V band/M band. Similarly, the SIW of antenna 100 can have significant isolation, which allows the SIW of antenna 100 to be easily used alongside other circuits on PCB materials. The mode structure can be further engineered by simply choosing the appropriate laminate with the desired dielectric constant.

Figure 2:
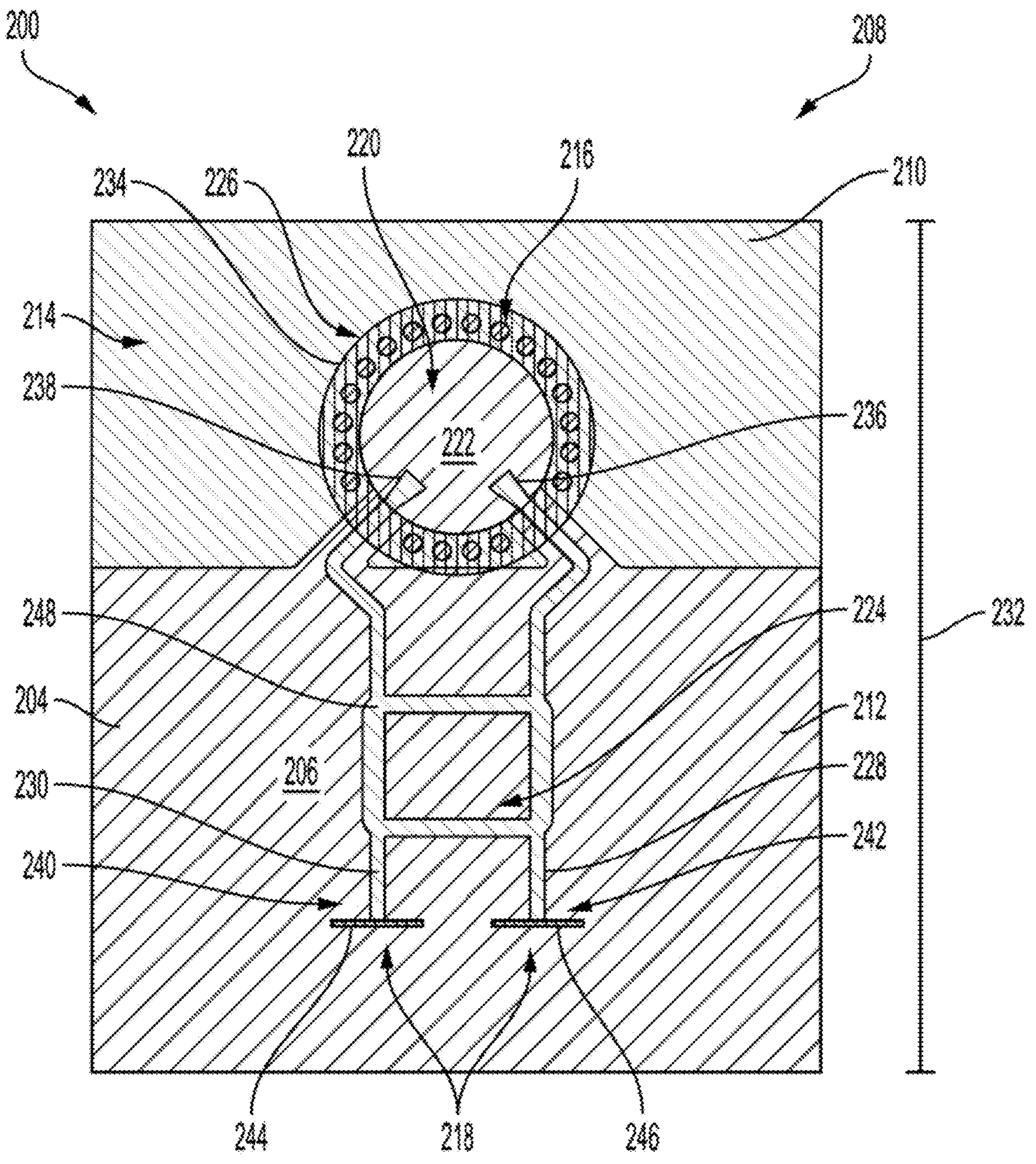
FIG. 2 illustrates a single antenna with dual feeds, according to one or more example embodiments.

FIG. 2 illustrates a configuration for a SIW transition with dual feeds 200, according to one or more example embodiments. SIW transition 200 is structurally the same as the SIW of antenna 100, thus the description of the layers applies to SIW transition 200 as well. SIW transition 200 includes dielectric substrate, which serves as the base for positioning other components of SIW transition 200. In the example embodiment, a dielectric layer 204 is layered on a first metallic layer 206 which is layered on the dielectric substrate. A top surface 206 of dielectric layer 204 corresponds to a PCB 208 with top surface 210 shown from a top view perspective in FIG. 2. As shown, top surface 206 of dielectric layer 204 includes PCB laminate 212 on some portions and second metallic layer 214 on other portions. Manufacturing SIW transition 200 may involve etching into portions of PCB laminate 212 to form second metallic layer 214 and drilling a set of metallic via-holes 216 per the desired arrangement as depicted in FIG. 1. As such, different techniques can be used during the manufacturing process.

Second metallic layer 214 of SIW transition represents a conductive layer coupled to top surface 206 of dielectric layer 204 and includes components that enable propagation of electromagnetic energy between different transmission mediums (e.g., a single-ended transmission line and a waveguide 226). Metallic layers can be made out of copper, aluminum, or other types of metals.

Second metallic layer 214 may be etched during manufacturing of SIW transition. Etching can be used in microfabrication to chemically remove layers from the surface of a wafer (e.g., top surface 206 of dielectric layer 204). In the embodiment shown in FIG. 2, second metallic layer 214 includes a non-conductive opening 220, a plurality of feeds 218 with a first end 236, 238 of each feed located in the non-conductive opening and a second end 240, 242 of each feed including a single-ended termination 244, 246, and an impedance transformer 248 between the plurality of feeds 218. These components may be created during the etching process. As such, second metallic layer 214 may be configured to couple to a waveguide 226 (e.g. an open ended waveguide) such that electromagnetic energy is able to propagate between the non-conductive opening 220 in the second metallic layer 214 and waveguide 226. In an example embodiment, waveguide 226 can be circular waveguide 234.

The plurality of feeds 218 can each include a respective single-ended termination. Feed 228 and feed 230 can extend along a length 232 of the PCB 208 assembly structure to allow electromagnetic energy to propagate through each feed 228, 230 from a respective transmission line to a circular waveguide 234. Feed 228 and feed 230 can include a first end 236, 238 and a second end 240, 242. Second end 240, 242 can be coupled to single-ended transmission lines, while first end 236, 238 can be positioned proximate to the circular waveguide 234.

In an example embodiment, the plurality of feeds 218 can include second ends with two single-ended terminations. For example, a first single-ended termination 244 and second single-ended termination 246. The two single-ended terminations can allow the antenna to propagate electromagnetic energy from a transmission line and produce an electromagnetic field with left-hand circular polarization from a first feed 228 of the and an electromagnetic field with right-hand circular polarization from a second feed 230. By having one field with left-hand circular polarization and another field with right-hand circular polarization, the fields are decoupled and can be used for bi-directional communications between identical PCBs. For example, feed 228 with left-hand circular polarization could be used to transmit while feed 230 with the right-hand circular polarization is used to receive.

Single-ended terminations represent a portion of second metallic layer 214 that can electrically couple to single-ended transmission lines, such as microstrips or other components on the PCB 208. In an example embodiment, a first single-ended termination 244 can couple to a first transmission line on the PCB 208 and a second single-ended termination 246 is configured to couple to a second transmission line on the PCB 208. In such a configuration, the first feed 228 may couple a first signal from the PCB 208 into a waveguide 226 via a combination of the through-hole extending through the dielectric substrate and the first metallic layer and the non-conductive opening 220 in the second metallic layer. In particular, a PCB 208 may supply signals that propagate a transmission along the first single-ended termination 244, impedance transformer 248, and into the waveguide 226 via the through-hole extending through the dielectric substrate and the first metallic layer and the non-conductive opening 220 in the second metallic layer while metallic via-through-holes 216 form boundaries that can limit the propagation of the signals in S1 W transition. In an example embodiment, the first feed 228 is configured to couple the first signal having a first circular polarization. The first circular polarization can be left-hand polarization, or right-hand polarization.

In addition, second feed 230 can similarly be configured to couple a second signal from the waveguide 226 to the PCB 208. In particular, electromagnetic energy propagates from the waveguide 226 into the SIW transition via the through-hole extending through the dielectric substrate and the first metallic layer and the non-conductive opening 220 in the second metallic layer and subsequently from second feed 230, to impedance transformer 248, to second single-ended termination 26 and to the second single-ended transmission line coupled to the PCB 208. In an example embodiment, the second feed 230 is configured to couple the second signal having a second circular polarization. The second circular polarization can be left-hand polarization, or right-hand polarization. However, the first circular polarization and the second circular polarization are different.

The length and width of the plurality of feeds 218 can vary in embodiments. For instance, the plurality of feeds 218 can be wider and/or longer in other embodiments. In addition, the plurality of feeds 218 are shown extending along the length 232 of top surface 206 of dielectric layer 204 and each on one half of the width of dielectric substrate. In other embodiments, the plurality of feeds 218 can have another position and orientation (e.g., diagonal) relative to dielectric substrate.

As further shown in FIG. 2, the non-conductive opening 220 forms a non-conductive circular portion 222 in the second metallic layer 214. The non-conductive opening 220 can be a plurality of shapes. In an example embodiment, the non-conductive opening 220 is circular, however in additional embodiments other shapes are possible, such as square and rectangular. The non-conductive opening 220 can be used in combination with the metallic layers to generate a more efficient waveguide 226. Specifically, the non-conductive opening 220 can be disposed over the through-hole extending through the dielectric substrate and the first metallic layer. The combination of metallic layers and non-conductive circular portion 222 in the second metallic layer can enable the power transfer between dielectric substrate and an open ended waveguide 226 positioned proximate the non-conductive opening 220 in the second metallic layer 214. Specifically, the open-ended waveguide 226 can be a circular-shaped waveguide coupled to the second metallic layer 214 surrounding a circular shape of the on-conductive opening 220. The first end 238 of feed 230 and first end 236 of feed 228 can be disposed in the non-conductive opening 220 to propagate electromagnetic energy between the waveguide 226 and the single-ended transmission line.

As illustrated in FIG. 2, the second metallic layer 214 can cover approximately a third of the top surface of the dielectric layer 204. However, the second metallic layer 214 may be divided into different shapes. For example, the non-conductive opening 220 can be a circular portion that is not metallic. This circular portion can be formed by refraining from etching the dielectric layer 204. Although the non-conductive opening 220 is not copper, the first feed 228 and the second feed 230 can extend into the non-conductive opening 220. Further, the second metallic layer 214 can include a trapezoidal shape between the first feed 228 and the second feed 230. The trapezoidal shape can be formed by the angle of the first feed 228 and the second feed 230 relative to non-conductive opening 220. The first feed 228 and the second feed 230 can enter the non-conductive opening 220 at a 90 degree angle from each other. For example, if the circular non-conductive opening 220 was split into quadrants, feed one 228 and feed two 230 can be positioned on two quadrant lines that meet at 90 degrees. However, feed one 228 and feed two 230 may not meet, but may only extend into non-conductive opening 220 by a quarter of a diameter of non-conductive opening 220. In the opposite direction, down the length 232 of the PCB 208 away from non-conductive opening 220, first feed 228 and second feed 230 can extend from the non-conductive opening in a perpendicular direction relative to a center of the non-conductive opening 220.

As previously mentioned, the second metallic layer 214 can include an impedance transformer 248 between the plurality of feeds 218. In an example embodiment, impedance transformer 248 can be a metallic rectangular connection 224 that extends between a first middle portion of first feed 228 and a second middle portion of second feed 230. Impedance transformer 248 can be used to adjust impedance for SIW transition. For instance, impedance transformer 248 can be used to match the impedance between electromagnetic energy coupling between the PCB 208 and the waveguide 226. In the embodiment shown, impedance transformer 248 can be used to keep first feed 228 and second feed 230 in quadratic phase while propagating electromagnetic energy. In other embodiments, impedance transformer 248 may have different configurations that depend on tapering the impedance between a single-ended transmission line and a waveguide 226.

In the embodiment shown in FIG. 2, second metallic layer 214 is coupled to a first half of top surface 206 of dielectric layer 204 such that only impedance transformer 248 and the plurality of feeds 218 are coupled to a second half of top surface 206 of dielectric layer 204. In other embodiments, the arrangement of second metallic layer 214 relative to top surface 206 of dielectric layer 204 can differ. For instance, when SIW includes longer single-ended terminations, the ratio of metallic layer and PCB laminate 212 can differ.

Similar to the SIW of antenna 100, SIW transition 200 also includes a third metallic layer (not shown) coupled to the bottom surface of dielectric substrate. SIW transition 200 can include multiple layers. For instance, the SIW transition may include a middle layer (i.e. dielectric substrate and first metallic layer), a top layer (i.e. PCB laminate 212 and second metallic layer 214), and a bottom layer (i.e. third metallic layer). As indicated above, etching or another process can be used to remove portions of PCB laminate 212 to create components in second metallic layer 214. For example, a machining process can be used to etch the plurality of feeds 218, impedance transformer 248, and non-conductive opening 220 out from PCB laminate 212. In an example embodiment, the first metallic layer, second metallic layer 214, and third metallic layer may be copper. In additional embodiments, they could also be another highly conductive metal or a combination of metals, such as gold, silver, aluminum, and/or brass.

Metallic via-holes 216 can be used to electrically couple second metallic layer 214 to the third metallic layer coupled to the bottom surface of dielectric substrate (not shown). As such, the quantity, size, and arrangement of metallic via-holes 216 can differ within examples. In the example embodiment, metallic via-holes 216 are positioned around the non-conductive opening 220 in the second metallic layer 214. Metallic via holes can represent fences that limit the propagation area of electromagnetic energy for SIW 200.

Figure 3:
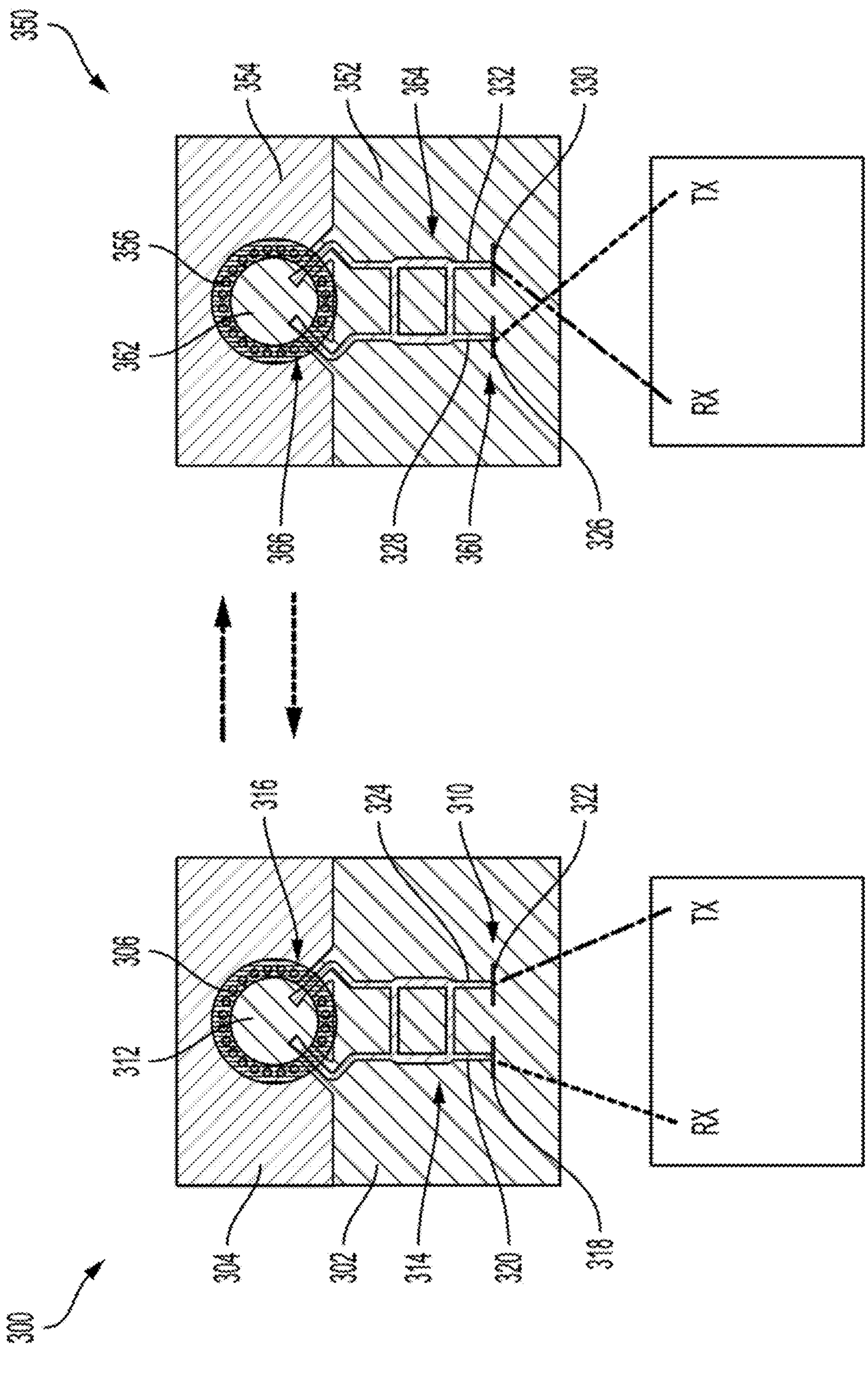
FIG. 3 illustrates two antennas with dual feeds in communication, according to one or more example embodiments.

FIG. 3 illustrates another configuration for a SIW transition, according to one or more example embodiments, with two antennas in communication. As shown, SIW transition 300 for antenna A and SIW transition 350 for antenna B are structurally similar to SIW transition 200. In the example embodiment, SIW transition 300 and SIW transition 350 similarly include dielectric layers 302, 352, second metallic layers 304, 354, and metallic via-holes 306, 356 that collectively enable SIW transition 300 and SIW transition 350 to efficiently propagate electromagnetic energy between respective single-ended transmission lines and waveguides. In other examples, SIW transitions can have another configuration with more or less components.

Second metallic layer 304 of SIW transition 300 and second metallic layer 354 of SIW transition 350 each include plurality of feeds 310, 360, non-conductive openings 312, 362 in the second metallic layer 304, 354, and impedance transformers 314, 364 between the plurality of feeds 310, 360. SIW transition 300 and SIW transition 350 are each coupled to waveguides 316, 366. The waveguides 316, 366 can transmit signals from single-ended transmission lines and receive signals for the single-ended transmission lines.

In an example embodiment, as previously mentioned, two antennas may be in communication. As shown in FIG. 3, the antennas can be antenna A and antenna B. Antenna A and antenna B can include identical PCBs with identical SIW transitions. Antenna A may include a first single-ended termination 318 coupled to first feed 320 and a second single-ended termination 322 coupled to second feed 324. First feed 320 may have a left-hand circular polarization and may be connected to antenna A receiver. Second feed 324 may have a right-hand circular polarization and may be connected to antenna A transmitter. Antenna B may include a third single-ended termination 326 coupled to third feed 328 and a fourth single-ended termination 330 coupled to fourth feed 332. Third feed 328 may have a left-hand circular polarization and may be connected to antenna B transmitter. Fourth feed 332 may have a right-hand circular polarization and may be connected to antenna B receiver. In an example embodiment, a signal can be transmitted and propagated through third feed 328 and waveguide 366 of antenna B to then be received by waveguide 316 of antenna A and propagated through first feed 320 to antenna A receiver. Simultaneously, a signal can be transmitted and propagated through third feed 328 and waveguide 366 of Antenna B to then be received by waveguide 316 of Antenna A and propagated through first feed 320 to antenna A receiver.

Because of the circular configuration, the PCBs previously described can be used in rotary joint applications to communicate. For example, the PCB of antenna A can rotate relative to the PCB of antenna B. Therefore, there may be an air gap between the waveguide 316 of antenna A and the waveguide 366 of antenna B. In an additional embodiment, the waveguides can be mechanically coupled together.

This configuration with two feeds can support bi-directional communication between antenna A and antenna B. However, in this configuration two of the connections to the single-ended terminations, such as the connections to third feed 328 and fourth feed 332, may be crossed in order to connect to the appropriate ports of a transceiver. When connections are crossed for one antenna, but not another, the insertion loss may be different between the two antennas. This can create a biased communication channel.

Figure 4:
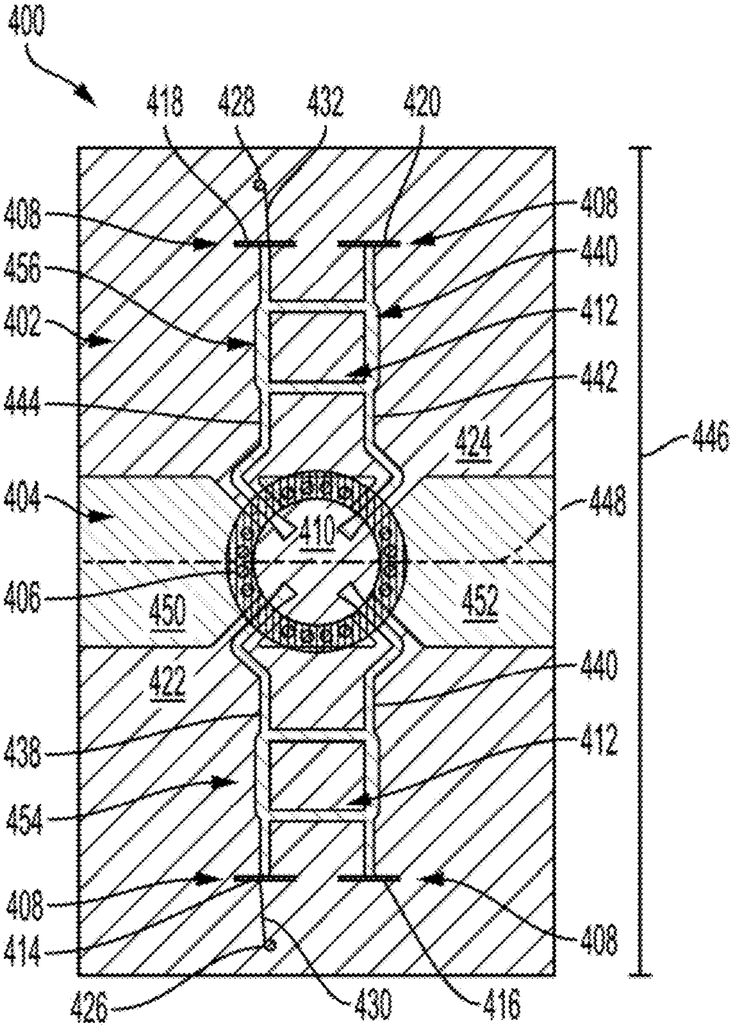
FIG. 4 illustrates a single antenna with quad feeds, according to one or more example embodiments.

FIG. 4 illustrates another configuration for a SIW transition with quad feeds 400, according to one or more example embodiments. As shown, SIW transition 400 is structurally similar to SIW transition 200 in some aspects and different in others. In the example embodiment, SIW transition 400 similarly includes the layers recited for SIW transition 200 such as dielectric layer 402, and second metallic layer 404. SIW transition 400 can similarly include metallic via-holes 406 that collectively enable SIW transition 400 to efficiently propagate electromagnetic energy between single-ended transmission lines and a waveguide. In other examples, SIW transitions can have another configuration with more or less components.

Second metallic layer 404 of SIW transition 400 includes non-conductive opening 410 in the second metallic layer, a plurality of feeds 408 with a first end of each feed location in the non-conductive opening 410 and a second end of each feed including a single-ended termination, and an impedance transformer 412 between each pair of single-ended terminations. Unlike SIW transition 200 in FIG. 2, SIW transition 400 includes four feeds 408. The four feeds 408 can include a first single-ended termination 414, a second single-ended termination 416, a third single-ended termination 418, and a fourth single-ended termination 420. As shown in FIG. 2, the first single-ended termination 414 and second single-ended termination 416 can be positioned on a first half 422 of the PCB and the third single-ended termination 418 and fourth single-ended termination 420 can be positioned on a second half 424 of the PCB.

In an example embodiment, two of the four single-ended terminations 408 can be connected to respective grounding via-holes 426, 428 by impedance matched resistors 430, 432, while the other two single-ended terminations 408 can be connected to a transmitter or receiver. For example, one single-ended termination from each half can be connected to a grounding via-hole by a 50 ohm resistors. In additional embodiments, other resistors can be used such as 100 and 150 ohm resistors. This configuration can reduce the possibility of insertion loss from crossing connections.

The plurality of feeds 408 can include four feeds extending into non-conductive opening 410 and a waveguide 458. For example, a first feed 438, a second feed 440, a third feed 442, and a fourth feed 444 can be positioned in the non-conductive opening 410. As further shown, the non-conductive opening 410 can be positioned in the center of the second metallic layer 404. Specifically, the non-conductive opening 410 can be at half of a length 446 of a PCB and half of a width 448 of a PCB. A first copper portion 450 and a second copper portion 452 can extend from the non-conductive opening 410 along the width 448 of the PCB. The second metallic layer 404 can include other components as well. For example, the metallic rectangle connecting feed one and feed two can be a first impedance transformer 454, and the metallic rectangle connecting feed three and feed four can be a second impedance transformer 456. First impedance transformer 454 can keep first feed 438 and second feed 440 in quadrate phase and second impedance transformer 456 can keep third feed 442 and fourth feed 444 in quadrate phase.

Figure 5:
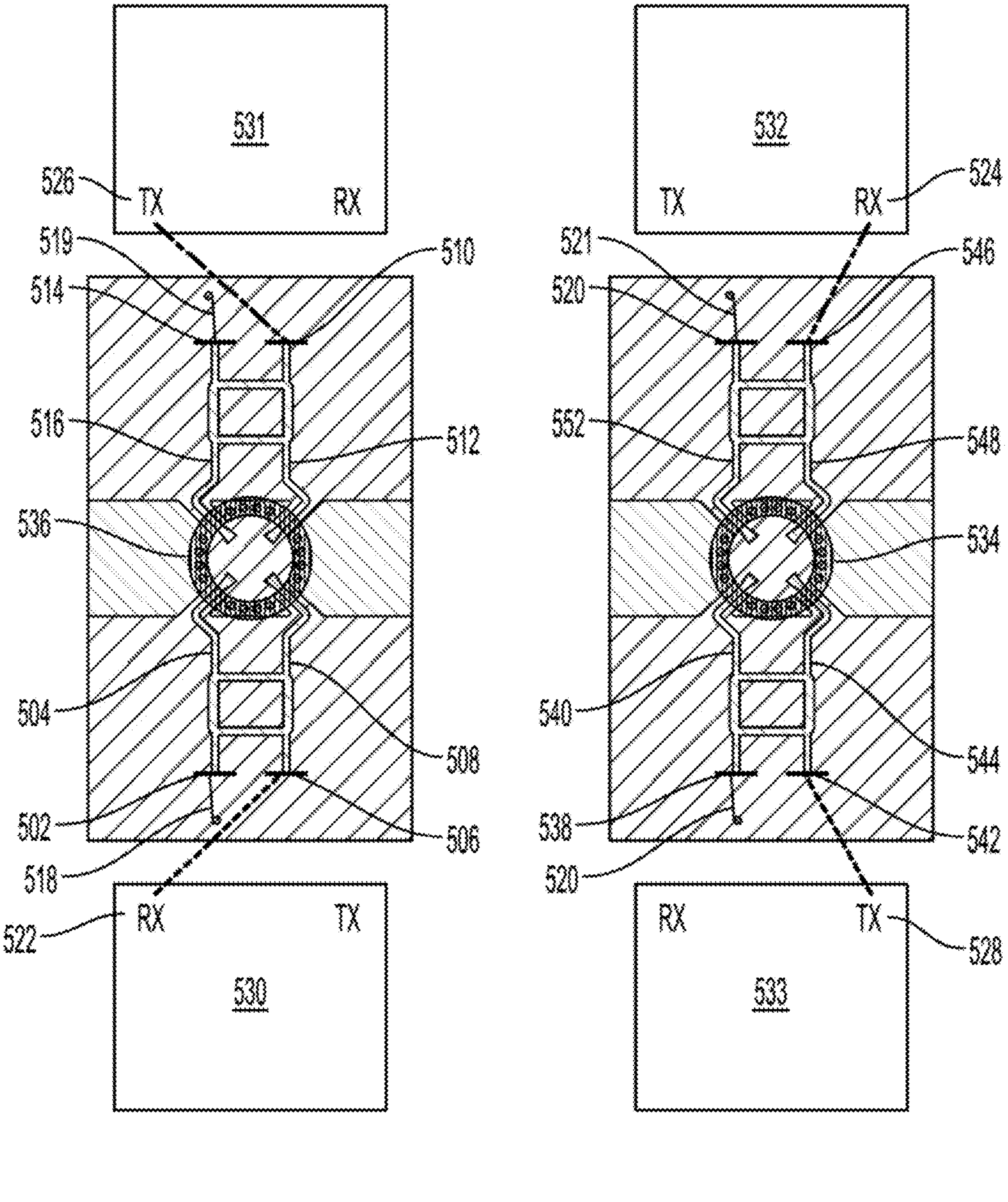
FIG. 5 illustrates two antennas with quad feeds in communication, according to one or more example embodiments.

In an example embodiment, as previously mentioned, two quad feed antennas may be in communication. As shown in FIG. 5, the antennas can be antenna A and antenna B. Antenna A and antenna B can include identical PCBs with identical SIW transitions. Antenna A may include a first single-ended termination 502 coupled to first feed 504, a second single-ended termination 506 coupled to second feed 508, a third single-ended termination 510 coupled to third feed 512, and a fourth single-ended termination 514 coupled to fourth feed 516. First feed 504 may have left-hand circular polarization and may be connected to grounding via-hole by an impedance matched resistor 518. For example a 50 ohm resistor. Second feed 508 may have right-hand circular polarization and may be connected to antenna A receiver 522. Third feed 512 may have left-hand circular polarization and may be connected to antenna A transmitter 526. Fourth feed 516 may have right-hand circular polarization and may be connected to grounding via-hole by an impedance matched resistor 519. For example a 50 ohm resistor. In an example embodiment, antenna A receiver 522 can be part of transceiver 530 and antenna A transmitter 526, can be part of transceiver 531 as shown in FIG. 5. In an additional embodiment, antenna A receiver 522 and antenna A transmitter 526 can be part of the same transceiver.

Antenna B can also include a first single-ended termination 538 coupled to first feed 540, a second single-ended termination 542 coupled to second feed 544, a third single-ended termination 546 coupled to third feed 548, and a fourth single-ended termination 550 coupled to fourth feed 552. First feed 540 may have left-hand circular polarization and may be connected to grounding via-hole by an impedance matched resistor 520. For example a 50 ohm resistor. Second feed 544 may have right-hand circular polarization and may be connected to antenna B transmitter 528. Third feed 548 may have left-hand circular polarization and may be connected to antenna B receiver 524. Fourth feed 552 may have right-hand circular polarization and may be connected to grounding via-hole by an impedance matched resistor 521. For example a 50 ohm resistor. In an example embodiment, antenna B receiver 524 can be part of transceiver 532 and antenna B transmitter 528, can be part of transceiver 533 as shown in FIG. 5. In an additional embodiment, antenna B receiver 524 and antenna B transmitter 528 can be part of the same transceiver.

In an example embodiment, a signal can be transmitted by transmitter 528 and propagated through second feed 544 and waveguide 534 of antenna B to then be received by waveguide 536 of antenna A and propagated through second feed 508 to antenna A receiver 522. Simultaneously, a signal can be transmitted by transmitter 526 and propagated through third feed 512 and waveguide 536 of antenna A to then be received by waveguide 534 of antenna B and propagated through third feed 548 to antenna B receiver 524. In this embodiment, first feed 504 and fourth feed 516 of antenna A and first feed 538 and fourth feed 550 of antenna B can be terminated with respective impedance matched resistors 518, 520. This configuration may provide a more symmetric way of connecting antennas to transceivers without having to cross connections. Unlike the dual feed antenna, the quad feed antenna may be used for bi-directional communication without the need to cross any feeds.

Because of the circular configuration, the PCBs previously described can be used in rotary joint applications to communicate. For example, the PCB of antenna A can rotate relative to the PCB of antenna B. Therefore, there may be an air gap between the waveguide 536 of antenna A and the waveguide 534 of antenna B. In an additional embodiment, the waveguides can be mechanically coupled together.

Figure 6:
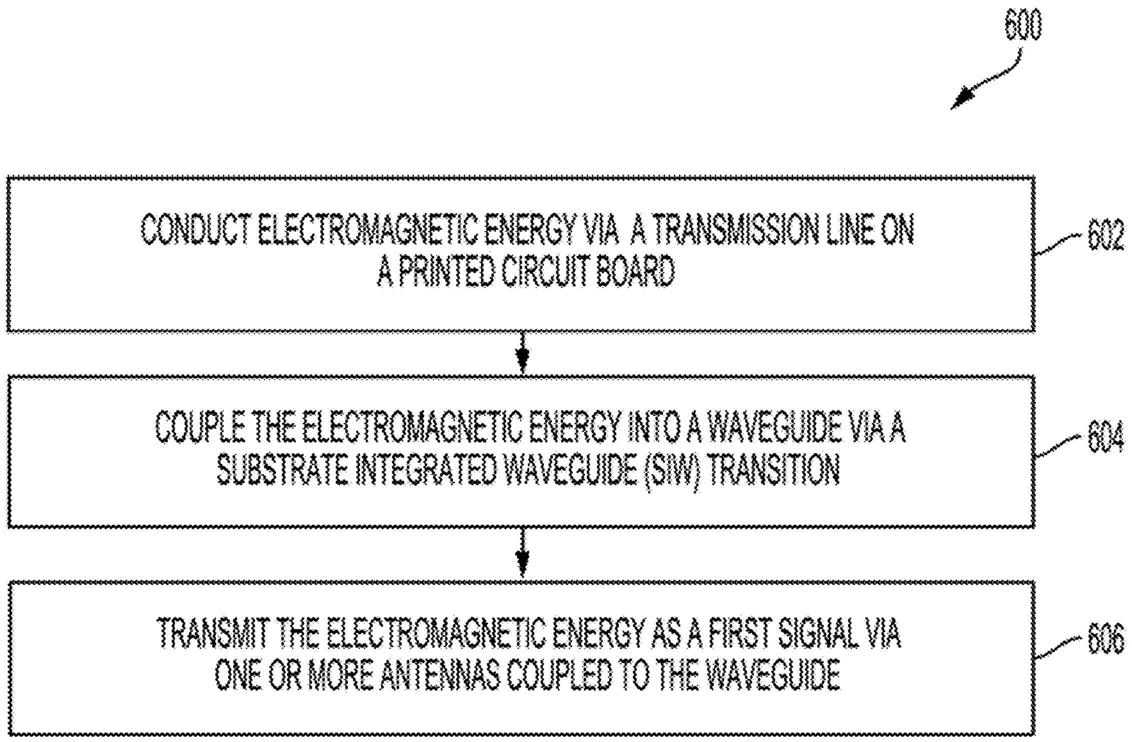
FIG. 6 is a flowchart of a method to couple electromagnetic energy into a waveguide via a SIW transition, according to one or more example embodiments.

FIG. 6 is a flowchart of a method to couple electromagnetic energy into a waveguide, according to one or more example embodiments. Method 600 may include one or more operations, functions, or actions, as depicted by one or more of blocks 602, 604, and 606, each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 602, method 600 involves conducting electromagnetic energy via a transmission line on a PCB. The PCB can be part of a system, such as a vehicle radar system, or LiDAR system. For instance, each radar unit or LiDAR unit may include a PCB that couples one or more waveguides to a PCB that is configured to generate signals for transmission and/or receives signals for processing. The transmission line may be a single-ended transmission line.

At block 604, method 600 involves coupling the electromagnetic energy into a waveguide via an SIW. The SIW may be implemented similar to SIW transition 200 shown in FIG.

2 or SIW transition 400 shown in FIG. 4. These SIW transitions can enable coupling the single-ended transmission line of the PCB directly to the waveguide.

As an example, the SIW may include a dielectric substrate and a first metallic layer. A bottom surface of the first metallic layer is coupled to the top surface of the dielectric substrate. The SIW can further includes a through-hole extending through the dielectric substrate and the first metallic layer. The SIW can also includes a dielectric layer with a bottom surface coupled to a top surface of the first metallic layer. A second metallic layer is coupled to the top surface of the dielectric layer. The second metallic layer includes a non-conductive opening, a plurality of feeds each with a first end located in the non-conductive opening and a second end of each feed including a single-ended termination, and an impedance transformer. The SIW also includes a third metallic layer coupled to a bottom surface of the dielectric substrate, and a set of metallic via-holes positioned proximate the non-conductive opening in the second metallic layer. The set of metallic via-holes electrically couple the second metallic layer to the third metallic layer. The single-ended termination can enable coupling the transmission line of the PCB to a waveguide with minimal losses.

At block 606, method 600 involves transmitting the electromagnetic energy as a first signal via one or more antennas coupled to the waveguide. For example, a radar unit may transmit the electromagnetic energy as radar signals using one or more antenna arrays. Alternatively, a LiDAR unit may transmit the electromagnetic energy as LiDAR signals using one or more antenna arrays. The waveguide can receive electromagnetic energy from the PCB through the SIW transition through the coupling between the single-ended transmission line of the PCB and the single-ended termination of the SIW transition.

In some embodiments, method 600 may also involve receiving one or more signals from the one or more antennas coupled to the waveguide and coupling electromagnetic energy corresponding to the one or more signals from the waveguide to the PCB via the SIW transition to engage in bi-directional communication. The antennas can receive signals from the environment and propagate the signals through the waveguide to the PCB via the SIW transition. For example, the waveguide can receive electromagnetic energy from the one or more antennas coupled to the waveguide and propagate a second signal through the SIW transition to a second transmission line on the PCB through the coupling of the second transmission line on the PCB and a second single-ended termination of the SIW transition. The second transmission line can also be single-ended.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. An apparatus comprising:

a dielectric substrate;

a first metallic layer, wherein a bottom surface of the first metallic layer is coupled to a top surface of the dielectric substrate;

a through-hole, wherein the through-hole extends through the dielectric substrate and the first metallic layer;

a dielectric layer, wherein a bottom surface of the dielectric layer is coupled to a top surface of the first metallic layer;

a second metallic layer coupled to a top surface of the dielectric layer, wherein the second metallic layer comprises:

a non-conductive opening, a plurality of feeds, wherein a first end of each feed is located in the non-conductive opening and a second end of each feed is a single-ended termination, and an impedance transformer;

a third metallic layer coupled to a bottom surface of the dielectric substrate; and a set of metallic via-holes positioned proximate the non-conductive opening in the second metallic layer, wherein the set of metallic via-holes electrically couple the second metallic layer to the third metallic layer.

2. The apparatus of claim 1, wherein the dielectric layer extends across the through-hole and the non-conductive opening in the second metallic layer is disposed over the through-hole.

3. The apparatus of claim 1, wherein the dielectric layer includes a printed circuit board (PCB) laminate, and wherein the second metallic layer is etched onto a portion of the PCB laminate.

4. The apparatus of claim 1, further comprising:

an open-ended waveguide positioned proximate the non-conductive opening in the second metallic layer.

5. The apparatus of claim 4, wherein the open-ended waveguide is a circular-shaped waveguide and wherein the non-conductive opening is a circular shape.

6. The apparatus of claim 1, wherein the impedance transformer comprises:

a metallic rectangular connection that extends between a first middle portion of a first feed from the plurality of feeds and a second middle portion of a second feed from the plurality of feeds.

7. The apparatus of claim 6, wherein the first feed and the second feed are configured to propagate electromagnetic energy in quadrate phase.

8. The apparatus of claim 1, wherein the second metallic layer is configured to couple to a waveguide such that electromagnetic energy is able to propagate between the non-conductive opening in the second metallic layer and the waveguide.

9. The apparatus of claim 1, wherein the plurality of feeds extend from the non-conductive opening in a perpendicular direction relative to a center of the non-conductive opening.

10. The apparatus of claim 1, wherein a first single-ended termination of a first feed is configured to couple to a first transmission line on a printed circuit board (PCB) and a second single-ended termination of a second feed is configured to couple to a second transmission line on the PCB.

11. The apparatus of claim 10, wherein the first feed is configured to couple a first signal between the PCB and a waveguide via a combination of the through-hole and the non-conductive opening in the second metallic layer, and wherein the second feed is configured to couple a second signal between the PCB and the waveguide via the combination of the through-hole and the non-conductive opening in the second metallic layer.

12. The apparatus of claim 11, wherein the first feed is configured to couple the first signal having a first circular polarization and the second feed is configured to couple the second signal having a second circular polarization, wherein the first circular polarization differs from the second circular polarization.

13. The apparatus of claim 1, further comprising:

a third feed and a fourth feed extending from the non-conductive opening in the second metallic layer.

14. The apparatus of claim 13, wherein a first feed and the third feed are coupled to a ground via-hole by an impedance matched resistor.

15. A system comprising:

a waveguide;

a substrate integrated waveguide (SIW) transition coupled to the waveguide, wherein the SIW transition comprises:

a dielectric substrate;

a first metallic layer, wherein a bottom surface of the first metallic layer is coupled to a top surface of the dielectric substrate;

a through-hole, wherein the through-hole extends through the dielectric substrate and the first metallic layer;

a dielectric layer, wherein a bottom surface of the dielectric layer is coupled to a top surface of the first metallic layer;

a second metallic layer coupled to a top surface of the dielectric layer, wherein the second metallic layer comprises:

a non-conductive opening, a plurality of feeds, wherein a first end of each feed is located in the non-conductive opening and a second end of each feed is a single-ended termination, and an impedance transformer;

a third metallic layer coupled to a bottom surface of the dielectric substrate; and a set of metallic via-through-holes positioned proximate the non-conductive opening in the second metallic layer, wherein the set of metallic via-through-holes electrically couple the second metallic layer to the third metallic layer.

16. The system of claim 15, wherein the dielectric layer extends across the through-hole and the non-conductive opening in the second metallic layer is disposed over the through-hole.

17. The system of claim 15, wherein the waveguide is a circular-shaped waveguide and wherein the non-conductive opening is a circular shape.

18. The system of claim 15, further comprising:

a third feed and a fourth feed extending from the non-conductive opening in the second metallic layer, and wherein a first feed and the third feed are coupled to a ground via-hole by an impedance matched resistor.

19. A method comprising:

conducting electromagnetic energy via a transmission line on a printed circuit board (PCB);

coupling the electromagnetic energy into a waveguide via an SIW transition, wherein the SIW transition comprises:

a dielectric substrate;

a first metallic layer, wherein a bottom surface of the first metallic layer is coupled to a top surface of the dielectric substrate;

a through-through-hole, wherein the through-through-hole extends through the dielectric substrate and the first metallic layer;

a dielectric layer, wherein a bottom surface of the dielectric layer is coupled to a top surface of the first metallic layer;

a second metallic layer coupled to a top surface of the dielectric layer, wherein the second metallic layer comprises:

a non-conductive opening, a plurality of feeds, wherein a first end of each feed is located in the non-conductive opening and a second end of each feed is a single-ended termination, and an impedance transformer;

a third metallic layer coupled to a bottom surface of the dielectric substrate; and a set of metallic via-through-holes positioned proximate the non-conductive opening in the second metallic layer, wherein the set of metallic via-through-holes electrically couple the second metallic layer to the third metallic layer, transmitting the electromagnetic energy as a first signal via one or more antennas coupled to the waveguide.

20. The method of claim 19, further comprising receiving, via the one or more antennas coupled to the waveguide, a second signal at a second transmission line on the PCB.

* * * * *